United States Patent [19]

Wright et al.

[11] 4,098,953

[45] Jul. 4, 1978

[54] BIAXIALLY ORIENTED SYNTHETIC LINEAR POLYESTER FILM BASE MATERIAL WITH COPOLYMER SUBBING LAYER

[75] Inventors: Peter John Wright, Ilford; Geoffrey Michael Dodwell; David Francis Jennings, both of Brentwood, all of England

[73] Assignee: Ciba-Geigy AG, Basel, Switzerland

[21] Appl. No.: 705,237

[22] Filed: Jul. 14, 1976

[30] Foreign Application Priority Data

| | | | |
|---|---|---|---|
| Jul. 23, 1975 | [GB] | United Kingdom | 30792/75 |
| Apr. 14, 1976 | [GB] | United Kingdom | 15164/76 |

[51] Int. Cl.$^2$ .......... B32B 27/06; B32B 27/36

[52] U.S. Cl. .......... 428/483; 428/578; 428/520; 428/910; 427/331; 427/12; 427/40; 96/75; 96/87 R; 526/8; 526/11

[58] Field of Search .......... 428/483, 518, 520, 910; 526/8, 11; 427/331

[56] References Cited

U.S. PATENT DOCUMENTS

| | | | |
|---|---|---|---|
| 2,808,331 | 10/1957 | Unruh et al. | 526/8 X |
| 2,835,580 | 5/1958 | Godowsky et al. | 526/8 X |
| 3,309,330 | 3/1967 | Settlage | 428/483 X |
| 3,480,693 | 11/1969 | Hill et al. | 428/483 X |
| 3,681,127 | 8/1972 | Fowler et al. | 428/483 |
| 4,002,802 | 1/1977 | Bayless | 428/483 |

*Primary Examiner*—P. C. Ives

*Attorney, Agent, or Firm*—Burgess, Dinklage & Sprung

[57] ABSTRACT

Film base material is provided which comprises a film of biaxially oriented synthetic linear polyester of highly hydrophobic character having superimposed thereon adherent to said film a subbing layer which contains a copolymer of vinylidene chloride, an alkyl acrylate or methacrylate, an allyl or methallyl component containing an active methylene group the monomer of which has the general formula

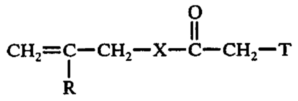

wherein T is —CN or —$COCH_3$, X is O, NH or S, and R is a hydrogen atom or methyl group and optionally at least one copolymerizable acid.

The subbing layer improves the adhesion between the film support and the photographic emulsion layers and prevents the separation of the layers or frilling when the final photographic film is processed.

7 Claims, No Drawings

BIAXIALLY ORIENTED SYNTHETIC LINEAR POLYESTER FILM BASE MATERIAL WITH COPOLYMER SUBBING LAYER

This invention relates to synthetic film materials, and more particularly to film base materials of use in the production of photographic materials.

It is known that self-supporting films formed of synthetic linear polyesters, particularly of the polyesters formed by reaction of ethylene glycol and terephthalic acid, may be prepared with mechanical and physical and chemical properties which, for example, render them very suitable indeed as base materials on which may be coated silver halide photographic emulsion layers for the production of photographic film materials.

However, since such base materials are inherently highly hydrophobic and the usual gelatino silver halide emulsions are highly hydrophilic, there is great difficulty in securing adequate anchorage between the base film and the emulsion layer, especially bearing in mind that the anchorage must remain firm throughout the processing sequence of the final photographic film.

It is known to deal with such a difficulty by the provision of an anchoring layer or layers (so-called "subbing" layers) between the film base and the emulsion layer, but the materials hitherto suggested for this purpose in connection with other film bases have not always proved entirely satisfactory when applied to film base of biaxially oriented synthetic linear polyesters of highly hydrophobic character.

Therefore according to the present invention there is provided film base material comprising a film of biaxially oriented synthetic linear polyester of highly hydrophobic character having superimposed thereon adherent to said film a layer which comprises a copolymer of vinylidene chloride, an alkyl acrylate or methacrylate, an allyl or methallyl component containing an active methylene group the monomer of which has the general formula

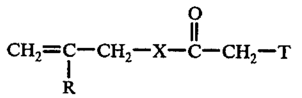

(1)

wherein T is —CN or —$COCH_3$, X is O, NH or S, and R is a hydrogen atom or methyl group and optionally at least one copolymerisable acid.

The copolymer may comprise from 20 - 90 mole % vinylidene chloride, from 5 - 50 mole % alkyl acrylate or methacrylate, from 0 - 20 mole % copolymerisable acid and from 1 - 30% of the allyl component.

Preferably the copolymer comprises from 40 - 85 mole % vinylidene chloride, from 10 - 40 mole % alkyl acrylate or methacrylate, from 3 - 20 mole % copolymerisable acid and from 5 - 25 mole % allyl component.

Examples of suitable acid units present in the copolymer are those derived from acrylic acid, methacrylic acid, itaconic acid, maleic acid, fumaric acid, crotonic acid, mesaconic acid and citraconic acid.

The copolymer of use in the present invention may be prepared and coated on the polyester base either as an organic solvent solution or as an aqueous latex. The actual copolymerisable ethylenically unsaturated monomer used in the copolymer depends on whether the copolymer is to be prepared as an organic solvent solution or as a latex.

When the copolymer is to be prepared as an organic solvent solution the alkyl acrylate or methacrylate is required to be present when the copolymer is formed because it helps to render the copolymer soluble in organic solvents and to help control the film forming properties of the copolymer.

The preferred alkyl acrylates or methacrylates are the lower alkyl acrylates, or methacrylates i.e. those having from 1 to 4 carbon atoms in the alkyl group.

When the copolymer is to be prepared as an organic solvent solution preferably it comprises from 40–80 mole % vinylidene chloride, from 10–50 mole % alkyl acrylate or methacrylate, from 5–20 mole % copolymerisable acid and from 5–28 mole % of the allyl component of formula (1).

The preferred copolymerisable acid when the copolymer is to be prepared as an organic solvent solution is acrylic acid.

When the copolymer is to be prepared as a latex the alkyl acrylate or methacrylate is required to be present to control and modify the film - forming properties of the copolymer.

When the copolymer is to be prepared as a latex the preferred copolymerisable acid is itaconic acid.

When the copolymer is to be prepared as a latex preferably it comprises from 60–85 mole % vinylidene chloride, from 7–20 mole % alkyl acrylate or methacrylate, 0.0 - 3 mole % copolymerisable acid and from 5–20 mole % of the allyl component of formula (1).

In the copolymer of use in the present invention the vinylidene chloride units give the copolymer good film-forming properties and good adhesion to the polyester. The presence of the allyl component of formula (1) which contains at least one active hydrogen atom in the copolymer which comprises the subbing layer enables a hydrophilic layer for example a gelatin or a polyvinyl alcohol based layer which has been coated on the film base material of the present invention to adhere very strongly to the film base material.

The presence of the copolymerisable acid component in the copolymer helps the overall dry adhesion properties of the copolymer subbing layer.

The allyl or methallyl cyano acetates of formula (1) may be prepared by reacting allyl or methallyl alcohol with cyanoacetic acid.

The allyl or methallyl cyanoacetamides may be prepared as described in U.S. Pat. No. 2,808,331.

Allyl or methallyl acetoacetate may be prepared by the noncatalytic ester exchange reaction of beta-keto carboxylic acid esters as described in U.S. Pat. No. 2,693,484.

The allyl or methallyl acetoacetamides may be prepared by the reaction of diketene with allyl or methallyl amine.

The allyl or methallyl acetothioacetates may be prepared by reacting allyl or methallyl mercaptan with diketene.

The allyl or methallyl cyano thioacetates may be prepared by the reaction of allyl or methallyl mercaptan with cyanoacetyl chloride.

The preferred monomers of formula (1) for use in the copolymer of use in the present invention are those wherein R is a hydrogen atom and X is O. The most preferred monomer is allyl cyanoacetate.

A particularly suitable copolymer prepared as an organic solvent solution for use in the present invention comprises 51.8 mole % vinylidene chloride, 23.0 mole % methyl acrylate, 18.3 mole % acrylic acid and 6.8 mole % allyl cyanoacetate.

The synthetic linear polyester of highly hydropobic character which is used in the present invention must be in a layer-receptive state before the layer which comprises a copolymer of vinylidene chloride, an alkyl acrylate or methacrylate an allyl or methallyl component and optionally at least one compolymerisable acid, as hereinbefore defined, can be coated thereon.

A polyester which has been biaxially oriented is highly hydrophobic but a film of polyester which has not been oriented at all or which been oriented in one direction only is receptive to a subbing coating. If such a subbing coating is applied to a polyester film which has been oriented in one direction only and is dried, the polyester film can then be oriented in the second direction and the applied coating as long as it comprises polymeric material which is above its second order transition temperature during the stretching will remain firmly anchored on the polyester film. This coating will then form a layer on to which more hydrophilic coatings can be applied. It is possible to coat polyester film which has not been oriented at all with a subbing layer and then to stretch it in two directions with the coating on it but this is not advantagous as the coating requires to be thicker which can lead to a poorer coating quality.

Therefore according to another aspect of the present invention there is provided a process for the production of film base material which comprises coating on at least one side of a film synthetic uniaxially oriented linear polyester an organic solvent solution or an aqueous latex of the copolymer as hereinbefore defined which contains units of the monomer of formula (1) drying the coating and completing the biaxial orientation.

Alternatively polyester film material and in particular biaxially oriented polyester film material may be treated so as to render its surface receptive to an applied coating.

Therefore according to another aspect of the present invention there is provided a process for the production of film base material which comprises treating at least one side of a film synthetic biaxially oriented linear polyester of highly hydropobic character to enable a polymer layer to adhere thereto and then coating on to the treated side or sides an organic solvent solution of the copolymer or an aqueous latex of the copolymer as hereinbefore defined which contains units of the monomer of formula (1).

In this aspect of the present invention when the said copolymer is coated either on the uniaxially oriented or on the biaxially oriented and treated film base as an organic solvent solution the said copolymer preferably comprises from 40 - 80 mole % vinylidene chloride, from 10 - 50 mole % alkyl acrylate or methacrylate, form 5 - 20 mole % copolymerisable acid and from 5 - 25 mole % of the allyl component of formula (1).

Preferably the copolymerisable acid is acrylic acid.

Preferably the alkyl acrylate is methyl acrylate.

Preferably the allyl component is allyl cyanoacetate.

The preferred organic solvents in which to dissolve the copolymer hereinbefore defined are methyl ethyl ketone, dioxan and acetone or mixtures thereof.

In this aspect of the present invention when the said copolymer is coated on the uniaxially oriented or the biaxially oriented and treated film base as an aqueous latex the said copolymer preferably comprises from 60 - 85 mole % vinylidene chloride, from 7 - 20 mole % alkyl acrylate or methacrylate, from 0 - 3 mole % copolymerisable acid and from 3 - 20 mole % of the allyl component of formula (1).

Preferably the copolymerisable acid is itaconic acid.

Preferably the alkyl acrylate is methyl acrylate.

Preferably the allyl component is allyl acetoacetate.

Preferably the treatment of the surface of the biaxially oriented film of synthetic linear polyester which enables a polymer layer to adhere thereto is to coat on to the surface of the polyester film an organic solvent solution or aqueous solution of a phenolic adhesion promoting agent and then to remove the solvent, preferably by evaporation.

Synthetic organic solvents in which to dissolve the phenolic adhesion promoting agents are methanol, ethanol, methyl ethyl ketone, acetone and dioxan and mixtures thereof.

By "phenolic adhesion promoting agent" is meant a phenolbased or naphthol-based compound which is capable of acting on the polyester film base so as to render its surface more receptive to an applied layer. Examples of such compounds are m - cresol, o-cresol, resorcinol, orcinol, catechol, pyrogallol, 1-naphthol each of which compounds may be substituted with one or more chloro, fluoro- or nitro substituents and phenol substituted with one or more chloro-, fluoro- or nitro-substituents. The action of the adhesion promoting agent on the polyester film base is thought to be swelling action and polyester surfaces so treated are receptive to certain polymeric subbing layers but not to hydrophilic layers for example a gelatin or polyvinyl alcohol.

Alternatively the film of biaxially oriented polyester may be treated by a physical method, for example corona discharge treatment, which renders the surface capable of accepting a resin layer as described in British Patent Specification Nos. 1,262,127, 1,267,215 and 1,286,457.

The film base material of the present invention is able to accept a hydrophilic layer adherent thereto, for example a gelatin based layer, a polyvinyl alcohol layer or polyvinyl acetal layer.

The gelatin based layer may be a gelatino silver halide emulsion layer but usually when initially biaxially oriented linear polyester film material is employed to prepare the film base material for use in the production of photographic gelatino silver halide material an intermediate gelatin layer is provided between the copolymer layer as hereinbefore defined and the silver halide emulsion layer. Such an intermediate layer is used in Examples 1 and 2.

However if the linear polyester film material used has been fully biaxially oriented only after the subbing layer is applied thereto then a gelatino silver halide emulsion will adhere to the film base of the present invention very strongly. Nevertheless, it is preferred that such photographic materials is aged or cured at an elevated temperature and/or humidity e.g. for 30 days at 25° C and 55% RH. This ageing enables the activated methylene group in the copolymer used as the subbing layer to interact with the gelatin to form a close bond therewith. This ensures that gelatino emulsion layer adheres very firmly to the film base and the danger of the layers frilling away during prolonged aqueous solution processing and washing is substantially eliminated.

If a gelatin sub layer is used between the subbing layer and the gelatino silver halide emulsion it is not necessary to have an ageing step but nevertheless the ageing step will increase the adhesion between the layers.

When the hydrophilic layer to be applied to the film base material as prepared by the process of the present invention is polyvinyl alcohol or polyvinyl acetal such a hydrophilic layer may comprise a light-sensitive diazonium salt to produce a diazotype material.

Alternatively after a polyvinyl alcohol or polyvinyl acetal layer has been coated on to the film base material as prepared by the process of the present invention the polyvinyl alcohol or polyvinyl acetal may have incorporated therein or be coated with a light-sensitive diazonium salt to produce a diazotype material.

PREPARATION 1.

Vinylidene chloride (60.6g) was mixed together with 23.9 g of methyl acrylate, 15.9 g of acrylic acid and 10.3 g of allyl cyanoacetate in 100 ml of methyl ethyl ketone to give 50% by volume solution, the temperature of the methyl ethyl ketone being 40° C. Then as copolymerisation initiator 1.0g of 2, 2' - azobisisobutyronitrile was added to the monomer solution. The solution was maintained at 40° C until the copolymerisation was complete, which took 6 days.

Infra-red spectra and titrimetric analysis showed that substantially all the monomers had been incorporated into the copolymer which thus contained about 51.8 mole % vinylidene chloride, 23.0 mole % methyl acrylate, 18.3 mole % acrylic acid and 6.8 mole % allyl cyanoacetate. This copolymer was used in Example 1 and is referred to therein as copolymer 1.

PREPARATION 2.

A second copolymer was prepared similarly using vinylidene chloride 60.6 g (50 ml), methyl acrylate 23.9 g (25 ml), acrylic acid 15.9 g (15 ml) and allyl acetoacetamide 10.4 g (10 ml). The resulting copolymer contained vinylidene chloride 52.2 mole %, methyl acrylate 23.2 mole %, acrylic acid 18.5 mole %, allyl acetoacetamide 6.1 mole %.

This copolymer was also used in Example 1 and is referred to therein as copolymer 2.

PREPARATION 3.

A third copolymer was prepared similarly using vinylidene chloride 48.5 g (40 ml), methyl acrylate 40.1 g (42 ml), acrylic acid 6.4 g (6 ml), itaconic acid 2 g and allyl acetoacetamide 10.4 g (10 ml). The resulting copolymer contained vinylidene chloride 43.8 mole %, methyl acrylate 40.8 mole %, acrylic acid 7.7 mole %, itaconic acid 1.3 mole % and allyl acetoacetamide 6.4 mole %.

This copolymer was also used in Example 1 and is referred to therein as copolymer 3.

PREPARATION 4.

A fourth copolymer was prepared similarly using vinylidene chloride 60.6 g (50 ml), methyl acrylate 23.9 g (25 ml), acrylic acid 15.9 g (15 ml) and allyl acetoacetate 10.3 g (10 ml). The resulting copolymer contained vinylidene chloride 52.3 mole %, methyl acrylate 23.2 mole %, acrylic acid 18.5 mole % and allyl acetoacetate 6.1 mole %.

This copolymer was also used in Example 1 and is referred to therein as copolymer 4.

PREPARATION 5.

A fifth copolymer was prepared similarly using vinylidene chloride 60.6 g (50 ml), methyl acrylate 23.9 g (25 ml), acrylic acid 15.9 g (15 ml) and vinyl acetate 9.3 g (10 ml). The resulting copolymer does not contain any allyl component of formula (1) and therefore this copolymer is not a copolymer as used in the present invention. However it was used in the comparative test set forth in Example 1 and is referred to therein as copolymer 5.

PREPARATION 6.

A sixth copolymer was prepared similarly using vinylidene chloride 48.5 g (40 ml), methyl acrylate 49.7 g (52 ml), acrylic acid 6.4 g (6 ml) and itaconic acid 2 g. The resulting copolymer does not contain any allyl component of formula (1) and therefore this copolymer is not a copolymer as used in the present invention. However it was used in the comparative test set forth in Example 1, and is referred to therein as copolymer 6.

PREPARATION 7

To 240 ml of de-oxygenated water was added vinylidene chloride (80 ml), methyl acrylate (10 ml) allyl acetoacetate (10 ml), sodium metabisulphite (1 g), sodium persulphate (1 g), alkyl aryl poly glycidol condensate (0.2 g), sodium alkyl aryl poly (oxyethylene) sulphate (0.9 g) and the mixture stirred at 25° C during polymerisation.

The resulting particularly suitable latex comprised vinylidene chloride 84.5 mole %, methyl acrylate 8.9 mole % and allyl aceto acetate 6.7 mole %.

This latex was used in Example 2 and is referred to therein as latex 1.

Two other latexes were prepared as in preparation 7 but neither contained a monomer of formula (1) as hereinbefore set forth.

PREPARATION 8

A latex was prepared as in Preparation 7 but the quantities of monomers added were as follows:

vinylidene chloride; 80 g
methyl acrylate; 10 g
itaconic acid; 2.25 g

The resulting copolymer does not contain any allyl component of formula (1) and therefore this copolymer is not a copolymer as used in the present invention. However is was used in the comparative test set forth in Example 2. The latex of this preparation is designated latex 2.

PREPARATION 9

A latex was prepared as in Preparation 7 but the quantities of monomers added were as follows:

vinylidene chloride; 97.5 g
methyl acrylate; 9.2 g
vinyl acetate; 11.2 g
itaconic acid; 2.25 g The resulting copolymer does not comprise any allyl component of formula (1) and therefore this copolymer is not a copolymer as used in the present invention. However the latex of this copolymer was used in the comparative test set forth in Example 2. The latex of this preparation is designated latex 3.

EXAMPLE 1

The following coatings were applied sequentially to biaxially oriented film based on the synthetic linear polyester obtained from ethylene glycol and terephthalic acid which is highly hydrophobic.

FIRST COATING:

solution of p - Chloro-m-cresol; 2 g
Methanol; 100 ml dried 2 minutes at 70° C.

SECOND COATING:

solution of Copolymer 1.
in methyl ethyl ketone 100 ml dried at 100° C for 5 minutes.

THIRD COATING:

Deashed gelatin; 1.68 ml
Glacial acetic acid; 1.20 ml
Water; 6.0 ml
Methanol; 90.7 ml
Ethyl lactate; 1.09 ml
Formalin 30% by weight aqueous solution 0.07 ml Air dried for 5 minutes followed by 15 minutes at 105° C. Five more similar subbed film bases were prepared using in the second coating instead of copolymer 1:

Second sample employed copolymer 2
Third sample employed copolymer 3
Fourth sample employed copolymer 4
Fifth sample employed copolymer 5
Sixth sample employed copolymer 6

Subsequently there was applied to the gelatin coating on each of the samples 1-6 a conventional photographic gelatino silver halide emulsion. In the cases of samples 1-4 it was found that all the layers adhered strongly one to another and to the film support so that the final photographic film would be processed without separation of the layers or frilling.

In the case of samples 5 and 6 which are outside the present invention some separation and frilling of the layers during processing was observed.

This is shown more clearly in a wet alkaline solution test. In this test a hardened coloured gelatin layer was coated on to all the samples 1-6 instead of gelatino silver halide emulsion layer, all the samples were placed in a 1 % sodium hydroxide solution at room temperature and a surface scratch was made in each sample at five minute intervals. The length of time for an enlarged scratch area to be produced was noted. The results are shown in table 1 below.

Table 1.

| Sample. | Time for enlarged scratch area to appear. |
|---|---|
| 1 | after 60 min. no enlarged area appeared |
| 2 | after 60 min. no enlarged area appeared |
| 3 | after 60 min. no enlarged area appeared |
| 4 | after 60 min. no enlarged area appeared |
| 5 | 10 minutes. |
| 6 | 15 minutes. |

This shows the superior adhesion exhibited by the film material of the present invention.

EXAMPLE 2

The following coatings were applied sequentially to three sets of samples of biaxially oriented film based on the synthetic linear polyester obtained from ethylene glycol and terephthalic acid.

FIRST COATING

Applied to all sets of samples
Solution of 4-chlororesorcinol; 2 g
in water; 100 ml
wetting agent; 0.075 g dried 5 minutes at 100° C.

SECOND COATING

Sample 1

Latex 1 of preparation 7 — 2% solids in water together with 0.0625% of an alkyl aryl polyglycidol condensate.

SAMPLE 2

Latex 2 of preparation 8 — 2% solids in water together with 0.0625% of an alkyl aryl polyglycidol condensate.

SAMPLE 3

Latex 3 of preparation 9 — 2% solids in water together with 0.0626% of an alkyl aryl polyglycidol condensate.

All the samples were then dried for 5 minutes at 100° C.

THIRD COATING

Applied to all three sets of samples
deashed gelatin; 10g
phenol; 0.01g
alkyl aryl polyglycidol condensate wetting agent; 0.075g
water to; 100ml Air dried for 5 minutes followed by seasoning at 102° C for 2 minutes.

Two types of adhesion are important the first is dry adhesion. This adhesion relates to the copolymer on the base and to the hydrophilic layer coated on the copolymer layer, the object of subbing being of course to enable the hydrophilic layer to remain firmly adherent on to the hydrophobic film base. The hydrophilic layer may be an anti-halation backing layer or a photosensitive layer e.g. a silver halide emulsion layer. It is important that other layers remain firmly anchored to the base when the film material is finished, i.e. cut up into small strips and enclosed in cassettes or spooled up. Further it is important that the hydrophilic layers do not frill off when the film is placed in the camera or when removed from the camera.

There are no recognised standard dry adhesion tests. However the following two sets were carried out on strips of the six sets of samples as prepared above each of which had been coated with a silver halide emulsion layer and then stored for 4 weeks after coating.

| Effect Observed. | No fringe. | Tear test. (strip torn) Small stripped fringe. | Large stripped fringe. | Lare areas peeled away. | Whole coating peels off. |
|---|---|---|---|---|---|
| Arbitrary Grade. | 1 | 2 | 3 | 4 | 5 |

Tape test.
(razor cuts made on surface of strips, tape applied and torn away.)

| Effect Observed | No coating removed. | Small amount removed. | More removed. | Large areas removed. | Whole coating removed. |
|---|---|---|---|---|---|
| Arbitrary Grade | 1 | 2 | 3 | 4 | 5 |

Strips of the three samples prepared above were subjected to these two dry tests, the results of which are shown in Table 2. The figure shown correspond to the Arbitrary Grade listed above.

Table 2

| Sample | Test | Grade | Remarks |
|---|---|---|---|
| 1 | Tear | 1 | Film base of invention |
| 2 | Tear | 2 | Film base not of invention |
| 3 | Tear | 2 | Film base not of invention |
| 1 | Tape | 1 | Film base of invention |
| 2 | Tape | 2 | Film base not of invention |
| 3 | Tape | 3 | Film base not of invention |

These results show that the film base according to the present invention exhibits very good dry adhesion but the film base not according to the present invention that is to say when the subbing copolymer used did not comprise any units of formula (1), did not exhibit adequate dry adhesion.

WET ADHESION

The film base of the present invention is of particular use as photographic film base in which case at least one photographic silver halide emulsion layer is coated on the subbed film base, such subbed base usually having a gelatin subcoat present between the polymer layer and the adhesion layer.

Such photographic film material is usually processed in a sequence of aqueous processing baths and it is very important that all the final image layer is retained firmly on to the base.

A typical processing sequence comprises immersion in the listed aqueous baths in the period stated, alkaline developer bath 3 minutes, acid stop-bath 1 minute, acid fix bath 10 minutes, aqueous washing in circulating water 20 minutes, followed by hot air drying.

However some modern processes particularly when forced development is required employ immersion in stronger alkaline solutions for longer periods. Thus a separate alkaline test was also included. This consisted on immersing the samples in 1% sodium hydroxide solution for 10 minutes followed by a normal washing. The samples were subjected to a scratch/rub test after wet processing this consisted of making a scratch mark in the coating on the film while still wet and then rubbing the film surface perpendicular to the scratch.

| Effect observed. | Wet tests. No peeling of emulsion. | Some peeling. | Areas of emulsion lift. | All emulsion lifts away. |
|---|---|---|---|---|
| Arbitrary Grade. | 1 | 2 | 3 | 4 |

Strips of the three Samples prepared above were subjected to these two wet tests and the results are shown in Table 3. The figures shown correspond to the Arbitrary Grades listed above.

Table 3.

| Sample | Test | Grade | Remarks. |
|---|---|---|---|
| 1 | Developer solution | 1 | Film base according to invention. |
| 2 | Developer solution | 3 | Film base not according to invention |
| 3 | Developer solution | 4 | FIlm base not according to invention |
| 1 | Mixer solution | 1 | Film base according to invention. |
| 2 | Mixer solution | 3 | Film base not according to invention |
| 3 | Mixer solution | 4 | Film base not according to invention |
| 1 | 1% Alkaline test | 1 | Film base of invention |
| 2 | 1% Alkaline test | 4 | Film base not according to invention |
| 3 | 1% Alkaline test | 4 | Film base not according to invention |

These wet tests show that the film base according to the present invention enables gelatin coatings to adhere very firmly to the film base during wet processing test even when the wet processing solution is strongly alkaline.

EXAMPLE 3

The following two solutions were prepared:

Solution (a)
Vinylidene chloride; 1030 ml
methyl acrylate; 132 ml
allylacetoacetate; 132 ml Solution (b)
water; 2600 ml
anionic surfactant; 20 g
nonionic surfactant; 3 g
sodium persulphate; 10 g
sodium metabisulphite 10 g Solution (a) and (b) are simultaneously pumped into a stirred 5 lite reactor under nitrogen, kept at 30° C over a period of 3 hours. The resulting latex was coated onto uniaxially oriented polyester prepared by extrusion onto a chilled drum, heating to between 80° and 100° C and stretching over capstan rollers of increasing circumferential speed to a draw ratio of about 3.

The copolymer layer was dried at about 90° C and the polyester was stretched laterally in a stenter apparatus at between 80° and 100° C to a draw ratio of about 3.

The biaxially oriented polyester was heat set at 210° C, while the tension was maintained for 1-4 minutes. The surface resistivity of the base was $10^9$ ohms at 64% RH thus elminating the need for a further antistatic layer. The base was directly coated with a gelatino silver halide emulsion and after ageing at 25° C and 55% RH for 30 days, the layers showed excellent adhesion when soaked in an alkaline photographic developing solution for 10 minutes, followed by 10 minutes in an acid fix solution and water washing over 30 minutes.

What we claim is:

1. Film base material comprising essentially a film of biaxially oriented synthetic linear polyester of highly hydrophobic character having superimposed thereon adherent to said film a layer which comprises a copolymer of 20 to 90 mole percent of vinylidene chloride, of 5 to 50 mole percent of an alkyl acrylate or methacrylate, of 1 to 30 mole percent of an allyl or methallyl component containing an active methylene group the monomer of which has the general formula

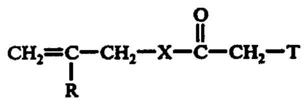

wherein T is —CN or —$COCH_3$, X is O, NH or S, and R is a hydrogen atom or methyl group and of O to 20 mole percent of at least one copolymerisable acid.

2. Film base material according to claim 1 wherein the said copolymer comprises from 40 - 85 mole % vinylidene chloride, from 10 - 40 mole % alkyl acrylate or methacrylate, from 3 - 20 mole % copolymerisable acid and from 5 - 25 mole % allyl component.

3. Film base material according to claim 1 wherein the copolymerisable acid units are derived from acrylic acid, methacrylic acid, itaconic acid, maleic acid, fumaric acid, crotonic acid, mesaconic acid or citraconic acid.

4. Film base material according to claim 1 wherein the alkyl acrylate or methacrylate comprises an alkyl group having from 1 to 4 carbon atoms.

5. Film base according to claim 1 wherein the component containing an active methylene group is an allyl acetate derived compound.

6. Film base material according to claim 5 wherein the component containing an active methylene group is allyl cyanoacetate.

7. Film base material according to claim 1 which had coated on the polymer layer a hydrophilic layer which is a gelatin based layer, a polyvinyl alcohol layer or a polyvinyl acetal layer.

* * * * *